United States Patent
Navarro Niedercorn

(10) Patent No.: US 7,798,176 B2
(45) Date of Patent: Sep. 21, 2010

(54) INSULATING PANEL FOR SUPPLY DUCT

(75) Inventor: Gabriel Navarro Niedercorn, Madrid (ES)

(73) Assignee: Saint-Gobain Isover, Courbevoie (FR)

( * ) Notice: Subject to any disclaimer, the term of this patent is extended or adjusted under 35 U.S.C. 154(b) by 1378 days.

(21) Appl. No.: 10/517,616

(22) PCT Filed: Jun. 18, 2003

(86) PCT No.: PCT/FR03/01854

§ 371 (c)(1),
(2), (4) Date: Sep. 27, 2005

(87) PCT Pub. No.: WO04/001277

PCT Pub. Date: Dec. 31, 2003

(65) Prior Publication Data

US 2006/0096652 A1    May 11, 2006

(30) Foreign Application Priority Data

Jun. 24, 2002  (ES) .................. 200201600 U
Jun. 24, 2002  (ES) .................. 200201601 U

(51) Int. Cl.
*F16L 9/14* (2006.01)
(52) U.S. Cl. .............. 138/149; 138/156; 138/161
(58) Field of Classification Search ............. 138/149, 138/158, 156, 161
See application file for complete search history.

(56) References Cited

U.S. PATENT DOCUMENTS

| | | | |
|---|---|---|---|
| 3,092,529 A | 6/1963 | Pearson | |
| 4,064,626 A | 12/1977 | Meshulam et al. | |
| 4,064,627 A | 12/1977 | Zanfini | |
| 4,179,808 A | 12/1979 | Smith | |
| 4,183,379 A * | 1/1980 | Marquette et al. | 138/158 |
| 5,040,297 A | 8/1991 | Scheinost | |
| 5,172,731 A * | 12/1992 | Nelson | 138/149 |
| 5,750,225 A | 5/1998 | Petty | |
| 5,783,268 A | 7/1998 | Noonan et al. | |
| 6,161,593 A * | 12/2000 | Lardillat et al. | 138/149 |
| 6,279,284 B1 * | 8/2001 | Moras | 52/408 |
| 2001/0003993 A1 | 6/2001 | Shelton et al. | |

FOREIGN PATENT DOCUMENTS

| | | |
|---|---|---|
| DE | 1 190 391 | 4/1965 |
| DE | 11 90 391 | 4/1965 |
| FR | 2 409 855 | 6/1979 |
| FR | 2 740 804 | 5/1997 |
| GB | 2 189 273 | 10/1987 |

* cited by examiner

*Primary Examiner*—Patrick F Brinson
(74) *Attorney, Agent, or Firm*—Oblon, Spivak, McClelland, Maier & Neustadt, L.L.P.

(57) ABSTRACT

An insulating panel for a conditioned-air distribution duct, a distribution duct including at least one insulating panel, a method for manufacturing a distribution duct using at least one insulating panel, and to an instrument for cutting the panel. The insulating panel includes at least one insulating core based on mineral wool, preferably on rock wool, and possibly including an exterior layer, for example based on a thin skin of aluminum. On one exterior face a plurality of marks are provided that are straight and oblique with respect to a longitudinal direction of the panel, the marks forming two sets of opposing inclinations oriented at an angle with respect to the longitudinal direction.

18 Claims, 9 Drawing Sheets

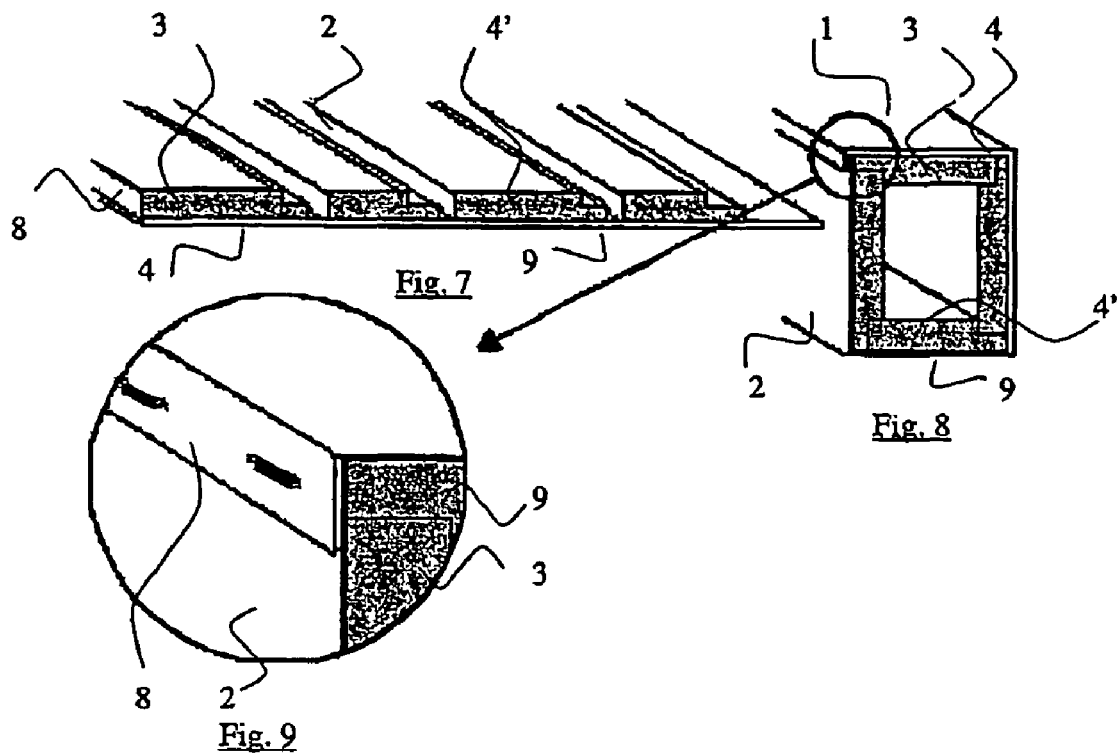
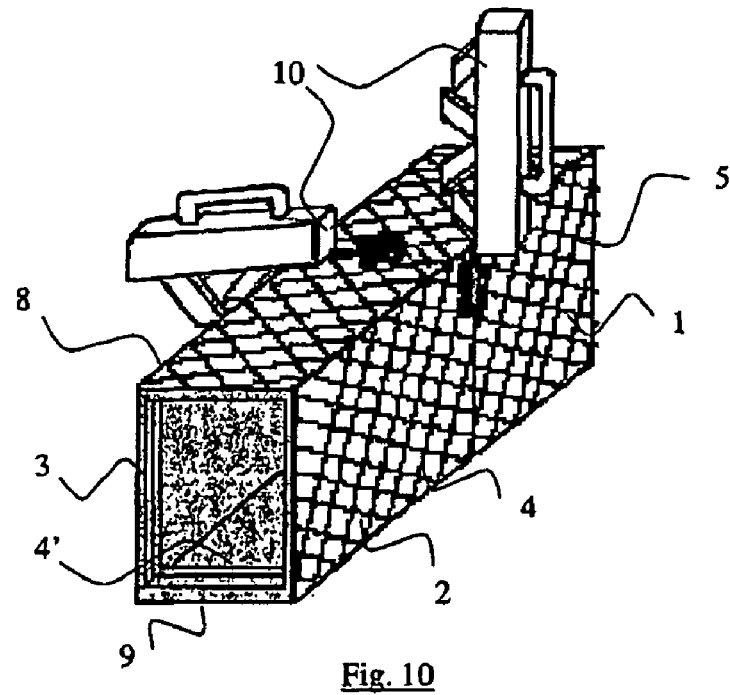

| $A_1$ (cm) | $D_1$ (cm) |
|---|---|
| 15 | 11.0 |
| 20 | 14.1 |
| 25 | 17.7 |
| 30 | 21.2 |
| 35 | 24.7 |
| 40 | 28.3 |
| 45 | 31.8 |
| 50 | 35.4 |
| 55 | 38.9 |
| 60 | 42.4 |

| $A_2$ (cm) | $D_2$ (cm) |
|---|---|
| 20 | 14.1 |
| 30 | 21.2 |
| 40 | 28.3 |
| 50 | 35.4 |
| 60 | 42.4 |
| 70 | 49.5 |
| 80 | 56.6 |

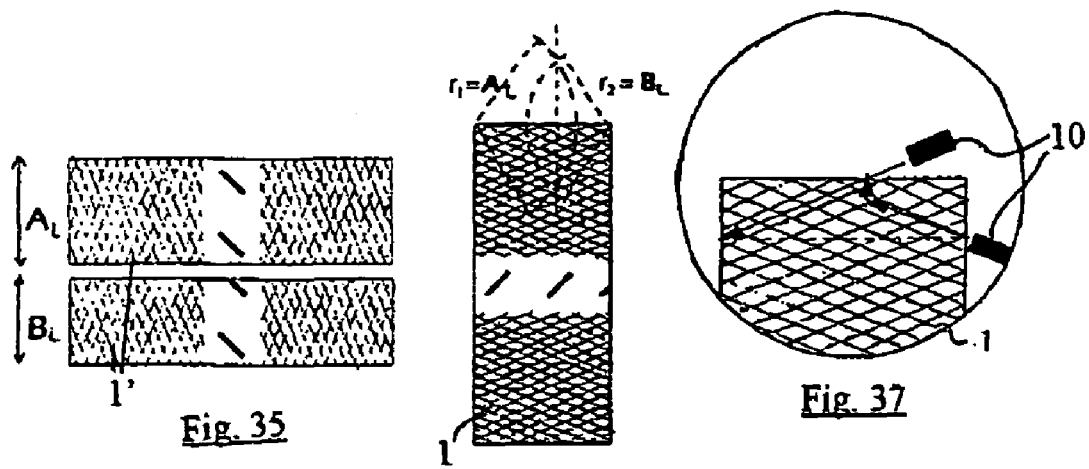
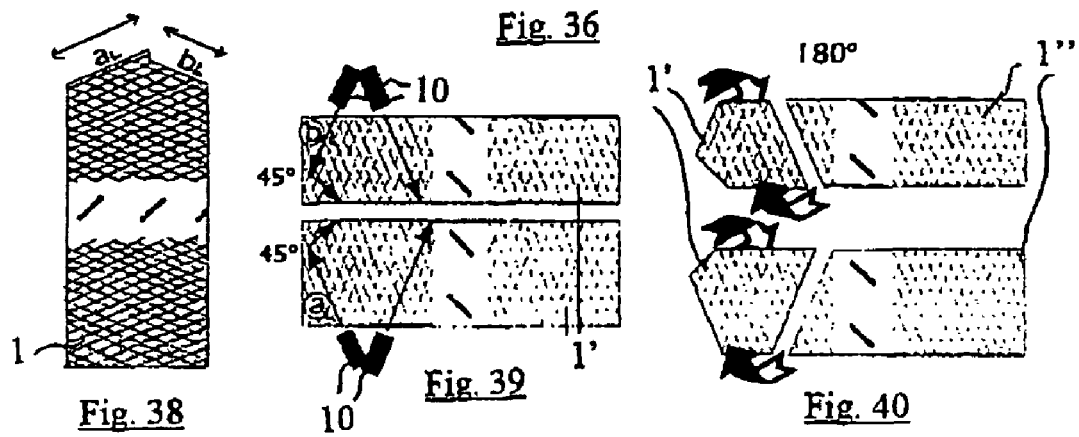
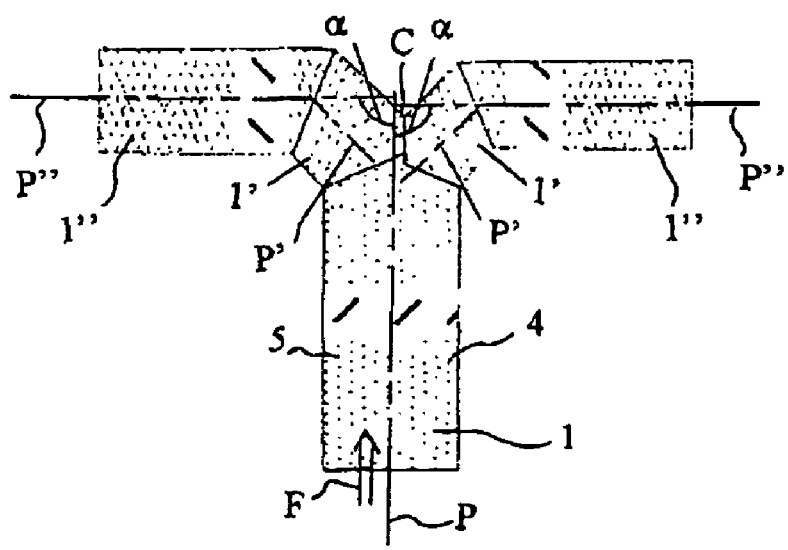

INSULATING PANEL FOR SUPPLY DUCT

CROSS-REFERENCE TO RELATED APPLICATIONS

The present patent document is the U.S. counterpart of WO 04/001277, and in turn claims priority to Spanish Application No. U 0201600filed on Jun. 24, 2002, and U 0201601 filed on Jun. 24, 2002, the entire contents of each of which are hereby incorporated herein by reference.

BACKGROUND OF THE INVENTION

1. Field of the Invention

The present invention relates to an insulating panel for a duct for distributing conditioned air, said insulating panel comprising at least one insulating core based on mineral wool, preferably on rock wool, and possibly comprising an exterior layer for example based on a thin skin of aluminum.

The present invention relates more specifically to the manufacture, in buildings, of ducts for transporting and distributing conditioned air. Such ducts generally have a metal structure made up of a self-supporting framework and of metal sheets arranged between the members of this framework, and on the inside of this duct, insulation made from insulating panels. The manufacture of these ducts for transporting and distributing conditioned air entails the incorporation of changes in direction to the duct, so as to distribute air to various points.

2. Description of Related Art

The prior art discloses a method for manufacturing insulating ducts whereby the direction-change angle is broken down into a great many angles of smaller magnitude. Thus, according to that method, the change in direction is very gradual and the intrinsic parameters of the air stream are modified only slightly as the stream gradually progresses through the change in direction.

BRIEF SUMMARY OF THE INVENTION

The purpose of the invention is to make it possible to reduce the head losses generated in the changes in direction produced according to the method of the prior art, while at the same time making the changes in direction easier to produce.

The subject of the present invention is therefore an insulating panel for a duct for distributing conditioned air.

This insulating panel comprises at least one insulating core based on mineral wool, preferably on rock wool, and possibly comprises an exterior layer for example based on a thin skin of aluminum. This panel also has, on an exterior face, a plurality of marks that are straight and oblique with respect to a longitudinal direction of said panel, said marks forming two sets of opposing inclinations oriented at an angle γ with respect to said longitudinal direction.

Said angle γ is preferably substantially between 82.5° and 52.5° and more preferably still is substantially equal to 67.5°.

Said exterior face of the panel also preferably has a plurality of transverse straight marks oriented at right angles to said longitudinal direction and, also as a preference, a plurality of longitudinal straight marks oriented parallel to said longitudinal direction.

Said oblique straight marks, and possibly said transverse straight marks and/or said longitudinal straight marks are preferably embodied at least near the longitudinal edges and preferably across the entire surface of the exterior face.

Said oblique straight marks, and possibly said transverse straight marks and/or said longitudinal straight marks are preferably embodied on the surface of the exterior face of the exterior layer of the panel.

In an alternative form, said transverse straight marks and/or said longitudinal straight marks intersect said oblique straight marks at points where longitudinal straight marks of opposing inclination intersect.

The oblique, transverse and straight guide marks thus make insulating ducts easier to manufacture and allow a saving in time and an increase in accuracy when marking out and cutting on site.

The marks are designed to coincide on the four faces of the duct once the necessary cuts have been made, without any offset, provided, however, that the interior measurements are multiples of 5 cm.

The present invention also relates to a distribution duct having a substantially parallelepipedal cross section, said panel being made from at least one insulating panel according to the invention.

Said duct preferably has a main longitudinal axis P and at least one change of direction at an angle β, altering the main longitudinal axis P into a downstream axis P', P'', said angle β being substantially between 30° and 60° and preferably substantially equal to 45°.

The present invention also relates to a method for manufacturing a distribution duct with a substantially parallelepipedal cross section using at least one insulating panel according to the invention.

According to this manufacturing method, said duct has a main longitudinal axis P and at least one change of direction at an angle β, altering the main longitudinal axis P into a downstream axis P', P'', said angle β being substantially between 30° and 60° and preferably substantially equal to 45°.

The method according to the invention thus makes it possible to produce a number of configurations with a significant reduction in head losses by comparison with the configurations of the prior art.

Within the meaning of the present invention, "configuration" is used for any non-straight duct resulting from a change in direction of its main axis with or without division of the air flow (for example: elbow with an angle greater than 90° or equal to 90°, inflection, single branch at a right angle with or without a change in cross section of the main duct, double branch at right angles, etc.).

A branch is the name given to a configuration that branches the air flow flowing through the network, altering the direction of part of the circulating flow (single or "y" branch) or altering the direction of all the circulating flow (double or "breeches" branch). To ensure adequate distribution, the upstream branch of a branch piece is always the one with the largest cross section.

Within the meaning of the present invention, "transverse direction" means a direction oriented at right angles to the overall longitudinal direction of the duct.

According to a first alternative form of embodiment of the invention, said change in direction is achieved by cutting each of the faces of said duct from a flat panel.

In this first alternative form, the faces of the duct that are parallel to the plane containing said change in direction each have more than four sides in this plane and preferably have six sides or eight sides.

According to a second alternative form of embodiment of the invention, said change in direction is achieved by completely sectioning a duct into a primary downstream portion and possibly a secondary downstream portion, and possibly rotating said primary portion or the secondary portion about its main axis.

According to this second alternative form of the invention, said sectioning is preferably performed on two faces parallel to the plane containing said change in direction at an angle $\beta$, with respect to a transverse direction of these faces, and on the other two faces, in a transverse direction of these faces.

The cutting according to the first alternative form or the sectioning according to the second alternative form is preferably performed using a cutting instrument having two blades situated in the same plane, the cutting edges of the respective blades being directed at opposing inclinations and the first cutting edge being shorter in height than the second cutting edge in the overall cutting or sectioning direction.

With the earlier method of construction, to manufacture a configuration (elbow, fork, etc.), openings were made in the face of the panel that remained inside the duct (because that was the only way to bend it to the desired curvature). The interior of the duct therefore had irregularities, even if these faces were covered with a strip. These irregularities subjected the air passing through the duct to numerous changes in direction, creating turbulence and therefore giving rise to head losses.

Advantageously, the method according to the invention makes it possible to eliminate these irregularities and therefore to reduce the head losses down the duct. Furthermore, it makes it possible to avoid dust, dirt, etc. produced by these irregularities from being deposited.

Advantageously also, the method according to the invention gives better rigidity to the configurations than the earlier method, because it uses, from its start point, a straight duct, the strongest part of the network.

Advantageously finally, the method according to the invention makes it possible to significantly reduce the number of offcuts of insulating material used, and the total area of these offcuts, thus making upkeep of the site easier and allowing savings on material.

The present invention also relates to a cutting instrument for cutting at least one insulating panel according to the invention, this instrument having two blades situated in the same plane, the cutting edges of the respective blades being directed at opposing inclinations and the first cutting edge being shorter in height than the second cutting edge in the overall cutting direction.

In an alternative form, said blades are directed at an angle $\delta$ with respect to a guide surface.

In a preferred version $\gamma=\delta$.

As a preference, the first cutting edge has a height shorter than the total thickness of the panel and the second cutting edge has a height greater than the total thickness of the panel.

The cutting instrument according to the invention gives a clean and precise cut, at the inclination suited to the formation of the configurations, hence giving a perfect join between the cut pieces that make up the configurations. These pieces remain closely assembled using adhesive, giving a perfect join equivalent to that using two straight sections.

BRIEF DESCRIPTION OF THE DRAWINGS

The present invention will be better understood from studying the detailed description below of some non-limiting exemplary embodiments and the attached figures:

FIGS. 7, 8 and 9 illustrate the production of a tubular duct from the panel of FIG. 6 bent at right angles along four longitudinal edges, FIG. 9 being a view of the detail of FIG. 8;

FIG. 10 is a perspective view of the operation of cutting a tubular duct to produce a change in direction according to the second alternative form of the method according to the invention;

FIGS. 35 to 41 illustrate the production of a change in direction achieving a double branch at two right angles a in a tubular duct according to the second alternative form of embodiment of the method according to the invention.

It is emphasized that, in order to make them easier to understand, the figures are not drawn strictly to scale.

It is also emphasized that the directions front-rear are to be understood with respect to the direction in which the air flows, considering that the duct is manufactured starting from the source of the air flow.

DETAILED DESCRIPTION OF THE INVENTION

Figure 1:
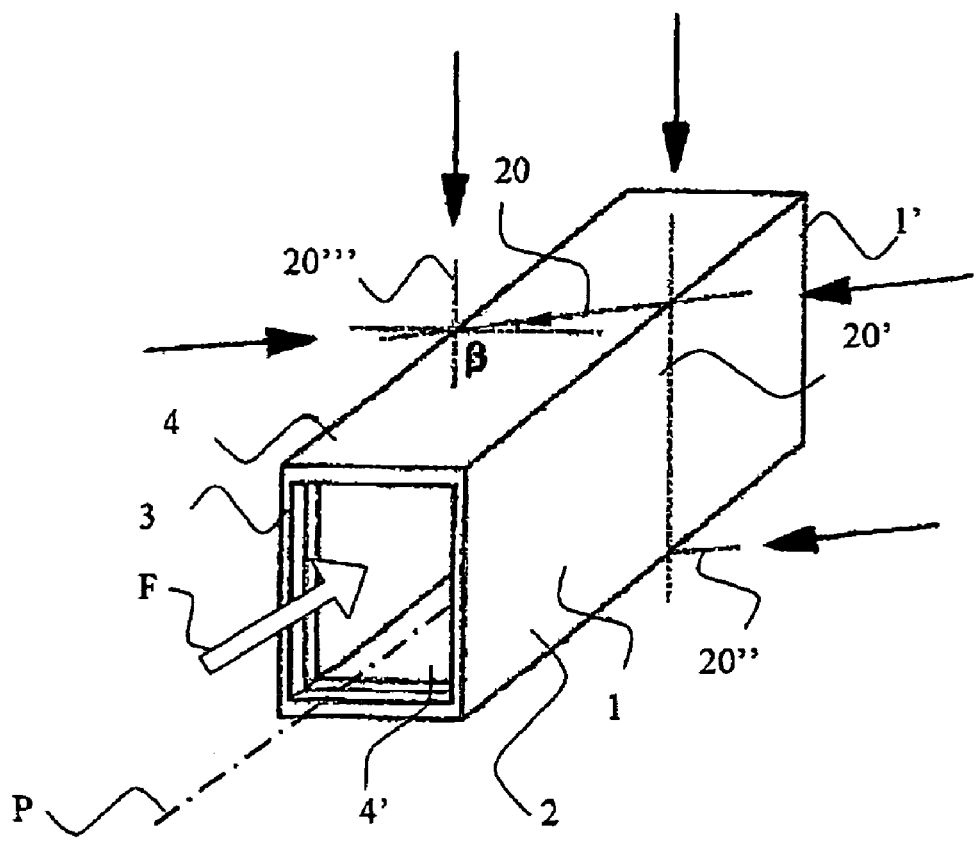
FIG. 1 illustrates a profile view of a straight tubular duct for producing a change in direction at an angle $\beta$.
Figure 2:
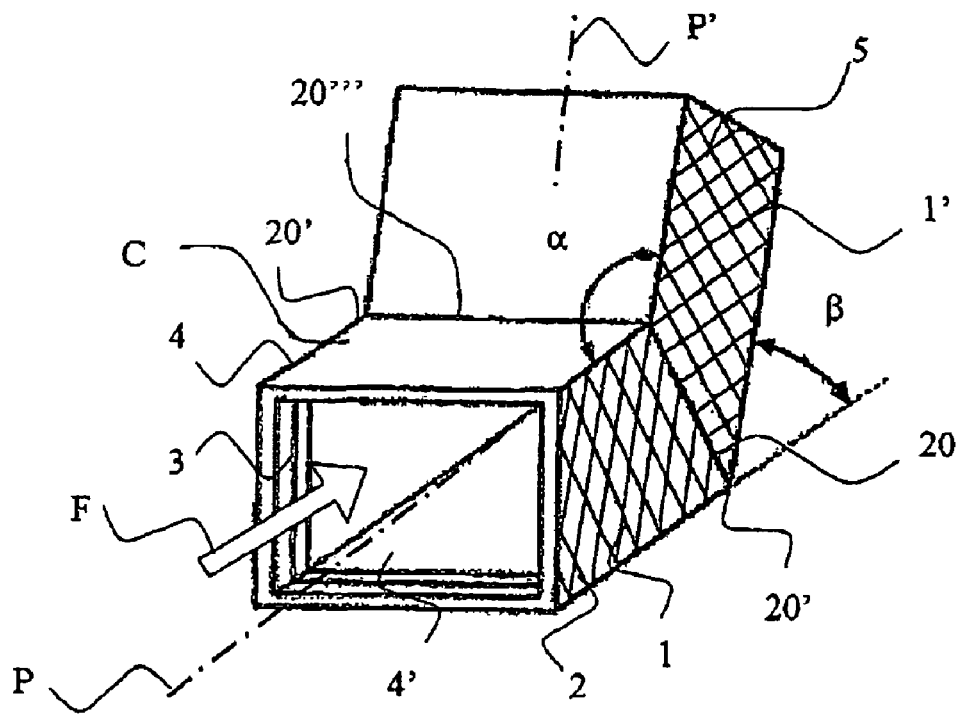
FIG. 2 illustrates a profile view of a tubular duct of FIG. 1 after the change in direction at the angle $\beta$ has been produced.

The present invention relates to the production of conditioned-air distribution ducts (1) of substantially parallelepipedal cross section, like the one illustrated in FIGS. 1 and 2, using at least one insulating panel (2) comprising at least one insulating layer (3) of mineral wool, and preferably of rock wool, said duct (1) having a main longitudinal axis P. The insulating duct (1) is intended to convey a conditioned-air flow F, the upstream side of the duct being connected to at least one conditioned-air source (not illustrated) and the downstream side of the duct being connected to at least one conditioned-air distribution outlet (also not illustrated). The air flow F is oriented substantially along the main axis P.

The minimum conditions for manufacturing and assembling tubular duct systems with glass wool core for the forced circulation of air at negative or positive pressure ranging up to 500 Pa and maximum speeds of 10 m/s are defined in a standard. The CLIMAVER PLUS and SISTEMA CLIMAVER METAL ducts made by SAINT GOBAIN ISOVER are suited to the implementation of the present invention and meet the standard because they allow pressures ranging up to 800 Pa and maximum speeds of 18 m/s. The duct (1), which is intended to be placed in a metal duct (not illustrated) to form a duct for transporting conditioned air, will be described in greater detail below.

The present invention relates more particularly to a method of producing a configuration of duct, so as to achieve at least one change in direction at an angle α or its supplementary angle β, altering the main longitudinal axis P to a downstream primary axis P' or to a secondary downstream axis P", that is to say involving a single change in direction or a change in direction with a split of the air flow.

This is needed because, when installing conditioned-air conveying ducts in a building, only in very exceptional circumstances can the duct be perfectly straight along its entire length, with no change in direction either relative to the horizontal or relative to the vertical between the conditioned-air source and the discharge opening; in the vast majority of cases, manufacture in a building of a duct for transporting and distributing conditioned air dictates changes in direction of the duct and therefore in its insulation, so that the air can be distributed to various contiguous rooms and to rooms on different floors.

In the prior art, it is explained that, in order to achieve a change in direction in a distribution duct, it is preferable to break this change in direction down into a great many straight sections arranged in such a way that their respective main axes are separated from the one before and the one after by just a few degrees.

In this way, it was thought that the air flow passing along inside the duct would then suffer the least possible modification to its intrinsic properties.

Now, it has surprisingly been found that the opposite is in fact true: to alter the intrinsic properties of the air flow passing along inside the duct as little as possible it is preferable for the change in direction to be broken down into the smallest possible number of straight sections and for these sections to be arranged in such a way that their respective main axes are separated from the one before and from the one after by the largest possible angle. However, right angles and acute angles (angles smaller than 90°) are to be forbidden.

Thus, according to the invention, said angle β is substantially between 30° and 60° and preferably substantially equal to 45°.

By way of example, when the head losses in a right-angled elbow of 30×30 cm cross section are 8 Pa for a duct manufactured according to the method of the prior art with an air speed of 7 m/s, they are just 5 Pa for a duct manufactured according to the method of the present invention with the same cross section and the same air speed.

Figure 3:
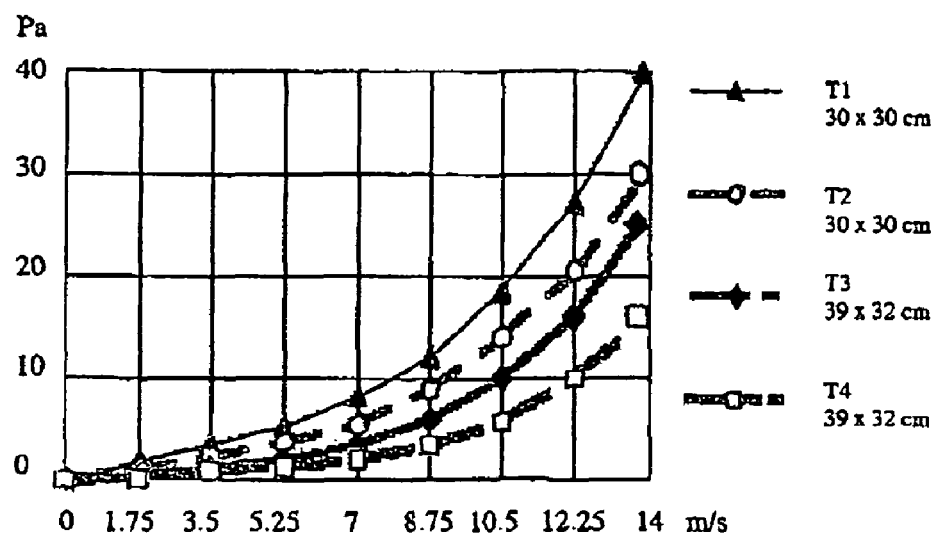
FIG. 3 is a table illustrating the differences in head loss between the changes in direction produced according to the method of prior art and according to the method of the invention for two types of duct section: 30×30 cm and 39×32 cm.

FIG. 3 illustrates the measurements of head loss (in Pa) taken on four types of right-angled elbow (T1 to T4) of square cross section 30×30 cm for T1 and T2 and of rectangular cross section 39×32 cm for T3 and T4 as a function of the speed of the air flow (in m/s), T1 and T3 being produced using the method of the prior art and T2 and T4 being manufactured according to the method of the present invention.

This figure shows that the head losses in an elbow of given cross section manufactured using the method of the present invention (curve T2 in broken line and open circles; curve T4 in broken line and open squares) are lower than those of the elbow with the same given cross section manufactured using the method of the prior art (curve T1 in continuous line, solid triangles; curve T3 in continuous line, solid diamonds), irrespective of the speed of the flow inside the elbow.

The method according to the invention makes it possible to eliminate the irregularities formed at the interior surface of the duct when a configuration is produced using the method of the prior and thus makes it possible to reduce the head losses through the duct which would otherwise be generated by these irregularities.

Manufacture of the various configurations of duct network begins with the marking-out, on the panel, of the various pieces that will then be cut out and assembled using a small number of lightweight and easy-to-handle tools.

The method for manufacturing the configurations according to the invention has two alternative forms of embodiment and of use of the panel (2) according to the invention.

Figure 4:
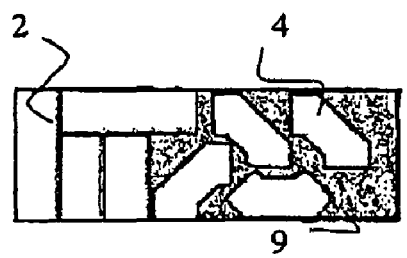
FIG. 4 illustrates a front view of a marked panel ready to be cut to produce two changes in direction in order to achieve a change in direction at right angles according to the first alternative form of the method according to the invention.

In the first alternative form of embodiment of the method according to the invention, said change in direction C is achieved by cutting each of the faces of said duct (1) from a flat panel (2) like the one illustrated in FIG. 4.

In this first alternative form, the faces of the duct which are parallel to the plane containing said change in direction C each have more than four sides in this plane, and preferably have six sides for a single change in direction or eight sides for a double change in direction allowing, ultimately, the direction to be changed through a right angle. In this way, the insulation is even better sealed at the direction change.

Figure 5:
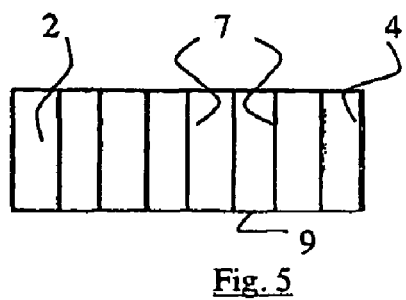
FIG. 5 illustrates a front view of a panel ready to be marked out and cut to produce two changes in direction to achieve a change in direction at right angles according to the second alternative form of the method according to the invention.

In the second alternative form of embodiment, the change in direction C is achieved by completely sectioning, that is to say cutting right through, an upstream duct (1) dividing it into a downstream primary portion (1') and possibly a downstream secondary portion (1") if the change in direction is a double one and, also, possibly rotating the primary portion (1') or the secondary portion (1") about its axis. The duct (1-1'-1") is made from a panel (2) like the one illustrated in FIG. 5.

It should be noted that the first alternative form of the method according to the invention produces about 1.5 m² of offcuts to manufacture two 90° elbows of 30×35 cm (approximately), these being illustrated by shading in FIG. 4, whereas the second alternative form produces no offcuts to manufacture the same two configurations.

FIGS. 1 and 2 schematically depict this second alternative form of embodiment of the method using a straight portion to obtain a change in direction through an angle α.

According to this embodiment, the starting point is a tubular duct (1) of rectangular cross section, on four of faces of which four straight marks (20, 20', 20", 20''') are made, in the traditional way, and taking suitable measurements, on the four faces of the duct, which straight marks, in the case of the lines or marks (20, 20") make an angle β with respect to a transverse line of the face in question at the corner of the duct and which, in the case of the lines (20', 20''') are parallel to said transverse line on the face concerned. The angle β is the supplementary angle of α, that is to say that α+β=180°.

The cuts along the marking lines (20', 20''') are made at right angles to the relevant face of the duct, but the cuts along the marking lines (20, 20") are made at an angle γ=90°−β. These cuts make it possible to produce a downstream primary duct portion (1') in the tubular duct (1).

To obtain the duct (1-1') elbowed at an angle α as illustrated in FIG. 2, all that is required is for the primary portion (1') to be turned through 180° and the rear edges of the downstream primary portion (1') to be positioned against the front edges of the upstream tubular duct (1). The duct (1-1') then forms an obtusely angled elbow, in other words an elbow angled at an angle α greater than 90°, to give rise to a change in direction of the air flow F.

Figure 6:
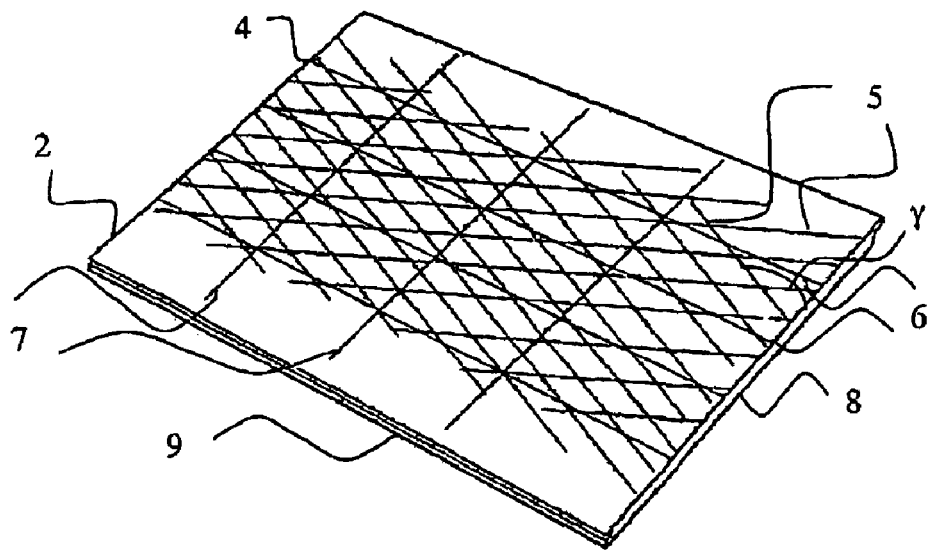
FIG. 6 illustrates a perspective view of a panel according to the invention for producing a tubular duct.

FIG. 6 illustrates a panel (2) for producing the tubular duct (1) according to the first or second alternative form of embodiment of the method according to the invention.

This panel (2) comprises at least one insulating layer (3) made of mineral wool and preferably of rock wool and has a substantially parallelepipedal and flat shape. It also comprises an exterior layer (4), which will be on the outside of the tubular insulating duct (1) when the latter is formed, and possibly an interior layer (4'), which will be on the inside of the tubular duct (1) when the latter has been formed. The exterior layer (4) is intended to be brought substantially into contact with the metal wall of conditioned-air transport duct.

The exterior layer (4) has, on its exterior face, a plurality of marks (5) that are straight and oblique with respect to the longitudinal edges (8) of said panel, said marks forming two sets of lines, one set being inclined at an angle γ=90°−β with respect to said longitudinal edges (8) and the other set being oriented at an opposite angle of −γ with respect to said longitudinal edges (8).

The exterior layer (4) also has a plurality of transverse straight marks (6) oriented at right angles to said transverse edges (9) and a plurality of longitudinal straight marks (7) oriented in the direction of the longitudinal edges (8).

The straight marks (5, 6, 7) thus allow the sheet (2), and therefore the tubular body (1) to be sized, so as to make it easier to facilitate the marking-out prior to cutting and the cutting.

These marks (5, 6, 7) are therefore used both to facilitate the marking-out and to facilitate the movement of the cutting tool when making the cuts.

The marks (5) have been illustrated on just one face of the duct (1) in FIG. 2 to make this figure easier to read, but they are obviously present on all the faces of the duct (1).

FIGS. 7, 8 and 9 illustrate an exemplary embodiment of a duct (1) made from a single sheet (4) bent along four longitudinal edges at right angles, according to the second alternative form of embodiment of the method according to the invention.

As can be seen in FIG. 7, the four pieces of the panel that are intended to form the faces of the duct each have a straight longitudinal edge and an opposite longitudinal edge shaped as a step, in other words rebated with a rebate of a depth equal to the edge face of the piece it will accommodate after the bending at 90°, and of a thickness equal to half the thickness of said edge face. One of the pieces also has an extension of the exterior layer that will be clipped over the top of the other piece, as can be seen in FIG. 9.

For certain panels, sealing is done using a strip of fabric impregnated with plaster and adhesive or using a self-adhesive aluminum tape.

The ducts are particularly well sealed, air leaks to the outside of the duct being negligible provided that this has been manufactured and assembled correctly.

The transverse connecting of elements to form the network of ducts is done by placing the surfaces of two duct portions in the same plane, clipping the rebate of one of the portions to the (unrebated) other one, and sealing the coupling using a self-adhesive tape. The transverse edges (9) of the elements for connection are shaped to form a "male" section and a "female" section. At these transverse edges, the density of the glass wool is far higher, and this increases the rigidity of the connection and improves the assembly.

The cutting of the panels (2), either in the flat state or once formed into a duct, can be done using a circular saw connected to an extraction system. The circular saw will be provided with a device allowing the cutting angle to be inclined, so as to allow cuts to be made at right angles, at 22.5° with respect to the vertical and at 45°, or even at other angles.

In a preferred form of the invention, the panels (2) are cut, either in the flat state, or once formed into a duct, using a special cutting instrument (10) illustrated first of all in FIG. 10 in respect of the implementation of the second alternative form of the invention. This instrument (10), illustrated in detail in FIGS. 11 to 15, has a guide surface (12) intended to slide along the surface of the panel (2), a handle (14) and two blades (15, 16) situated in the same plane and each having a cutting edge (17, 18). These cutting edges (17, 18) are oriented in this plane at opposite inclinations with respect to the guide surface (12).

The first cutting edge (17), that of the first blade (15), is oriented backwards with regard to the direction of cutting and is shorter in height than the second cutting edge (18), that of the second blade (16), which is oriented forwards; however, the two blades (15, 16) do not touch. The first cutting edge (17) is shorter in height than the total thickness of the panel (2) and the second cutting edge (18) has a height greater than the total thickness of the panel (2).

Figure 11:
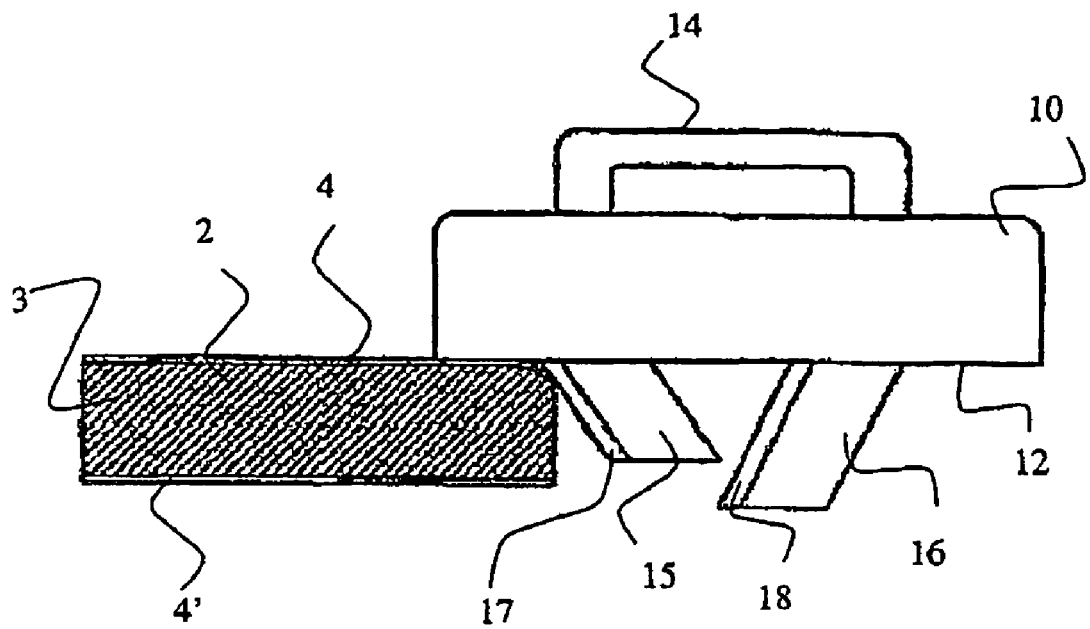
FIG. 11 illustrates a view in cross section of a panel while work is being done on the exterior edge of the panel using a cutting instrument according to the invention.
Figure 12:
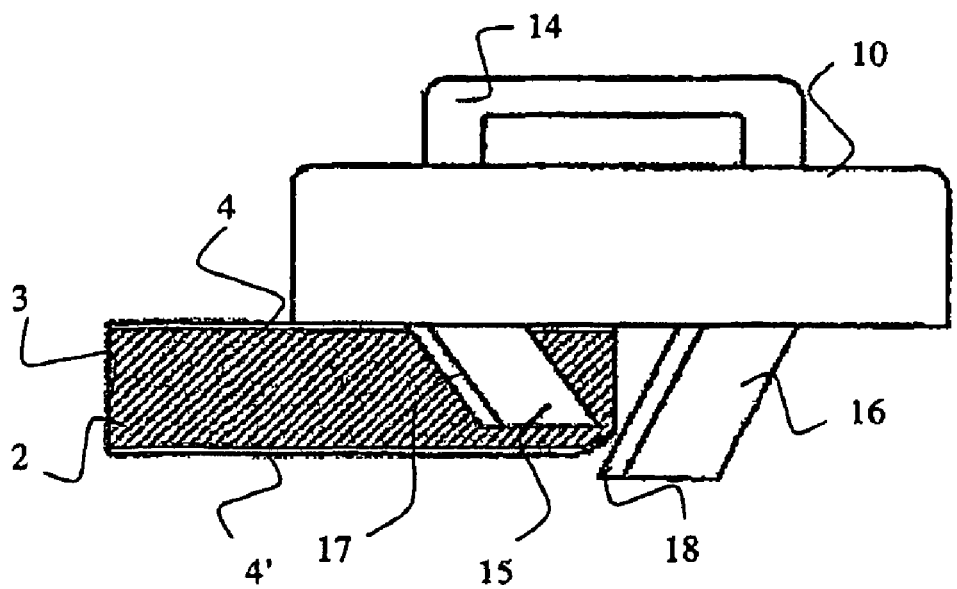
FIG. 12 illustrates a view in cross section of a panel while work is being done on the lower edge of the panel using a cutting instrument according to the invention.

Thus, as can be seen in FIG. 11, when cutting begins, when the first blade (15) is about to cut into the exterior surface (7), it will cause this surface to be pushed in towards the core of the panel before correctly cutting this surface, and as can be seen in FIG. 12, when the second blade (16) then goes to cut into the interior surface (4') it too will push this surface in toward the core of the panel before correctly cutting this surface. No delamination can therefore occur when cutting the panel, because the angle of attack of the cutting edges is always acute, on each side of the panel.

Figure 13:
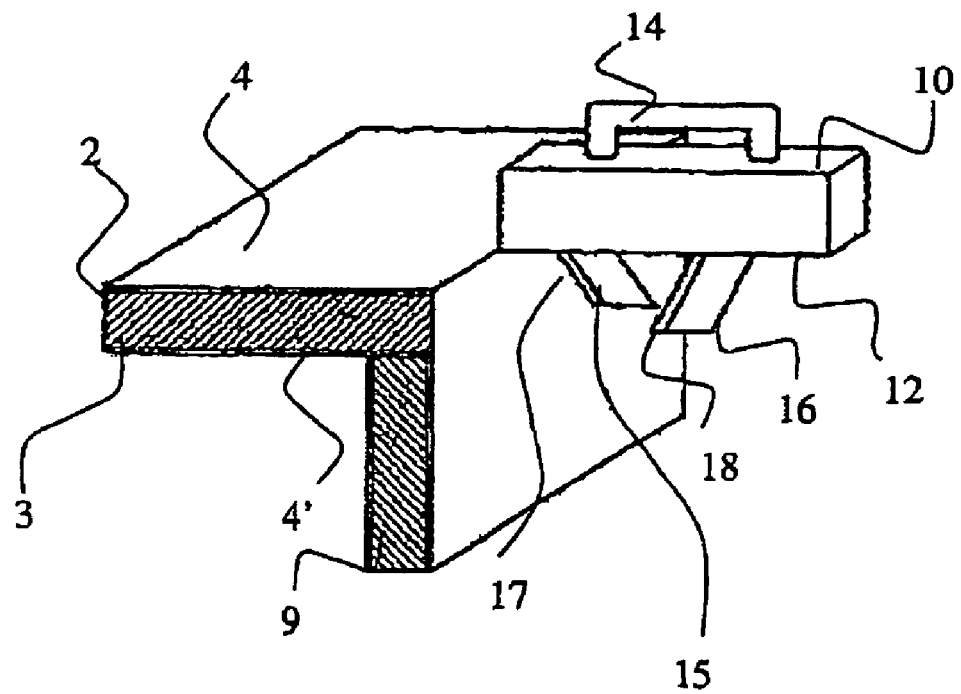
FIG. 13 illustrates a partial perspective view of a tubular duct before work is done on the edge of the panel using a cutting instrument according to the invention.

The instrument (10) according to the invention also allows the cutting of a panel (12), even when this panel is already made into a duct, as can be seen in FIG. 13. By virtue of the arrangement of the blades 15, 16) and of their respective cutting edges (17, 18), it is possible to begin to cut a duct at a corner without causing any burring or delamination.

Figure 14:
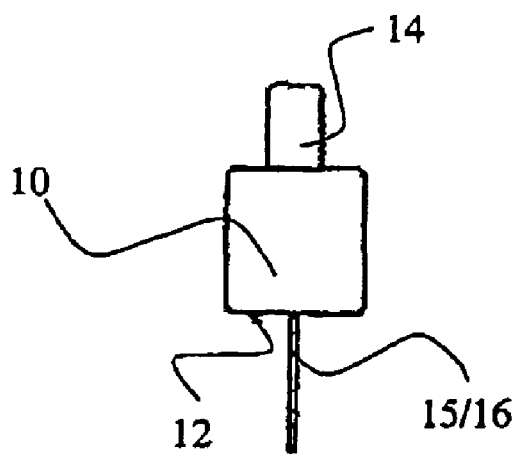
FIG. 14 illustrates a front view of a first version of the cutting instrument according to the invention with straight blades.

In a first version of the invention, illustrated in FIG. 14, the cutting instrument (10) has straight blades (15, 16), that is to say blades oriented at right angles to the guide surface (12).

This version makes it possible to make straight cuts, such as the cuts (20 and 20") in FIGS. 1 and 2.

Figure 15:
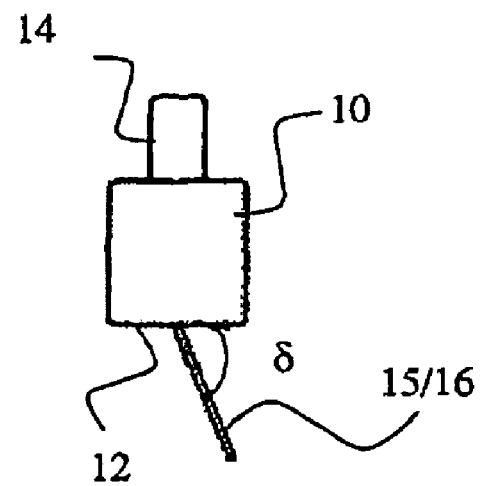
FIG. 15 illustrates a front view of a second version of the cutting instrument according to the invention, with inclined blades.

In a second version of the invention, illustrated in FIG. 15, the cutting instrument (10) has inclined blades (15, 16), that is to say blades oriented at an angle δ with respect to the guide surface (12). This version makes it possible to make inclined cuts, such as the cuts (20' and 20''') in FIGS. 1 and 2. In this case, γ=δ.

It is possible to anticipate for the blades (15, 16) to be equipped with a system allowing their inclination with respect to the guide surface (12) to be adjusted or for the blades (15, 16) to be removable and to collaborate with a rail formed in the guide surface (12), a plurality of rail types dictating different blade inclinations.

The constructions of the changes in direction using the second alternative form of the method according to the invention will be described hereinafter.

However, the making of changes in the direction (elbows or any other type of configuration) characterized by pure (circular) curves will be avoided, given that these require even more cuts of the interior coating of the duct, thus weakening the configuration and possibly damaging the glass wool if the cut is not executed correctly.

a. Elbows at angles α greater than 90° (FIGS. 16 to 18)

Figure 16:
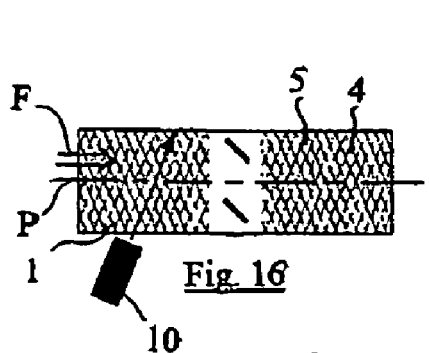
FIGS. 16 to 18 illustrate the production of a change in direction at an angle $\alpha$, the supplementary angle of the angle $\beta$, not a right angle, in a tubular duct according to the second alternative form of the method according to the invention.

To produce an elbow at an angle α greater than 90°, the cutting line is marked on the exterior surface (4) of the duct (1) using the marks (5), as illustrated in FIG. 16, and the cut is made using a tangential circular saw, or preferably using the instrument (10), along the imaginary plane passing through the duct at right angles to the main axis P and passing through this cutting line. Cuts inclined at β° are preferably made first, before those perpendicular to the surface (4) of the duct.

Figure 17:
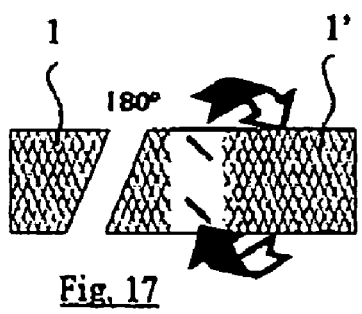
Figure 18:
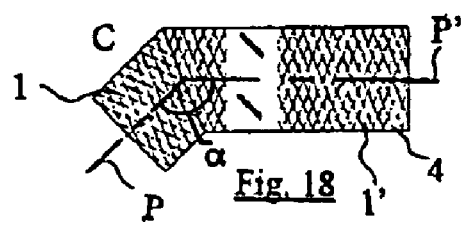

As can be seen in FIG. 17, the duct is turned on itself through 180° and then positioned so that its axis P' intersects the axis P of the upstream duct, as can be seen in FIG. 18.

As it is not possible to produce a male-female nested joint or to use rebates to clip together the two parts that make up the elbow, a bead of adhesive is applied along the edges that are to be connected, this being done in proximity to the lower edge of the duct. The connecting region is then sealed, on the outside and around the periphery, using a self-adhesive aluminum tape. The tape will maintain the shape and rigidity of the connection, both inside and out.

Figure 19:
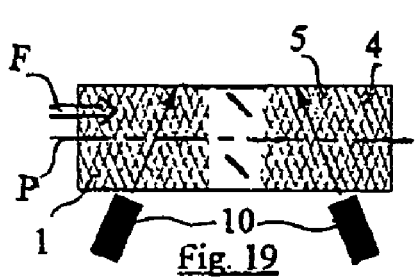
FIGS. 19 to 21 illustrate the production of a change in direction at an angle $\alpha$, the supplementary angle of the angle $\beta$, a right angle, in a tubular duct according to the second alternative form of the method according to the invention, FIG. 21 being supplemented by a table explaining the separations $D_1$ between the main duct and the secondary portion as a function of the minimum length $A_1$ of the primary portion.
Figure 20:
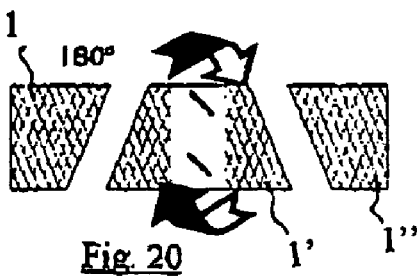
Figure 21:
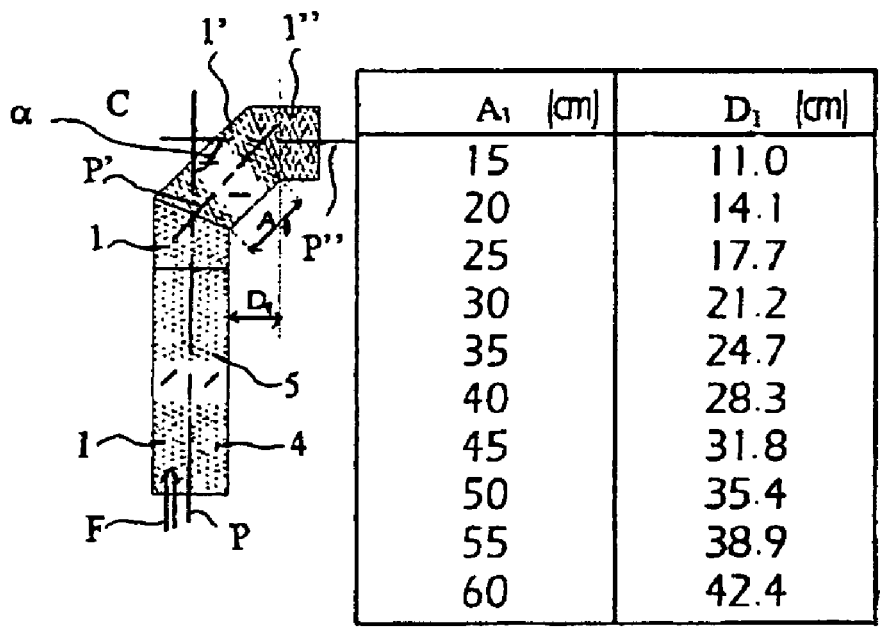

To reduce head losses, it is advisable to provide deflectors in elbows with an angle α of less than 135°. The sheet that holds the deflectors or fins in place inside the duct will be secured using self-tapping screws and washers fitted from the outside.

b. Elbows at angles α of 90° (FIGS. 19 to 21)

To produce an elbow at an angle α of 90°. An angle of 22.5° with respect to an imaginary perpendicular section is marked on the exterior surface (4) of the duct (1) as illustrated in FIG. 19, and a line is drawn. The same line is then drawn on the opposite face and these two lines are joined by transverse lines drawn across the two remaining faces.

The exterior surface (4) of the panel comprises a template made of marks (5) making it easier to draw the lines that will act as cutting lines.

A tangential circular saw or preferably the instrument (10) is used to cut the duct along the lines, paying particular attention to the inclination of the cut (perpendicular to the surface of the duct in the case of the lines at an angle of 22.5° and inclined by 22.5° in the case of the transverse lines). This then gives the first of the three pieces that will form the elbow: the main duct (1).

At a distance of more than 15 cm away from the first sectioning operation, the same operation is performed again, but at an angle of −22.5° with respect to an imaginary perpendicular section. This then gives the three duct portions (1, 1', 1").

The intermediate piece of the duct formed by the primary portion (1') is then turned on itself through 180° as illustrated in FIG. 20, to form the elbow, and the three portions (1, 1', 1''') are connected in such a way that their respective axes (P, P', P''') intersect in pairs at the respective connections at a 45° angle as illustrated in FIG. 21. The angle α between the most upstream axis P and the most downstream axis P''' is 90°.

Quite particular attention will be paid to the precision with which the 22.5° angle is measured, otherwise elbows of less than 90° (closed elbows) or of more than 90° (open elbows) will be obtained.

In this case, there is no need to provide deflectors.

The pieces are sealed as explained in the previous section.

The table of FIG. 21 explains the separations D, between the main duct (1) of the secondary portion (1") as a function of the minimum length $A_1$ of the primary portion (1').

c. Inflections (FIGS. 22 to 25)

An inflection is a deviation in the direction of the duct that is sometimes needed to avoid obstacles in the straight path of the duct. The cross section of the duct is kept constant over its entire course.

The method for producing an inflection is very similar to the method for producing a 90° elbow.

Figure 22:
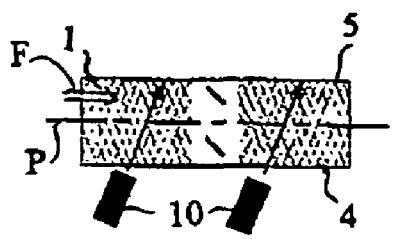
FIGS. 22 to 25 illustrate the production of a change in direction achieving a deviation without a change in the overall orientation of a tubular duct according to the second alternative form of embodiment of the method according to the invention, FIG. 25 being supplemented by a table explaining the separations $D_2$ between the main duct and the secondary portion as a function of the minimum length $A_2$ of the primary portion.

To produce an inflection, a 22.5° angle with respect to an imaginary perpendicular section is marked on the exterior surface (4) of the duct (1) as illustrated in FIG. 22, and a line is drawn. The same line is then drawn on the opposite face and these two lines are joined by transverse lines drawn on the remaining two faces.

The exterior surface (4) of the panel comprises a template made of marks (5) making it easier to draw the straight lines that will act as cutting lines.

A tangential circular saw or preferably the instrument (10) is used to cut the duct along the lines, paying particular attention to the inclination of the cut (perpendicular to the surface of the duct in the case of the lines at an angle of 22.5° and inclined by 22.5° in the case of the transverse lines). This then gives the first of the three pieces that will form the inflection: the main duct (1).

At a distance of more than 20 cm away from the first sectioning operation, the same operation is performed again, but at an identical angle of +22.5°. This then gives the three duct portions (1, 1', 1").

Figure 23:
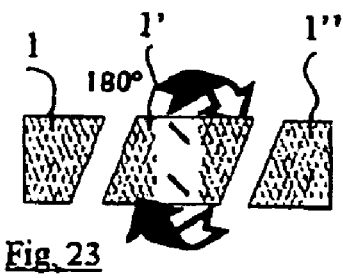
Figure 24:
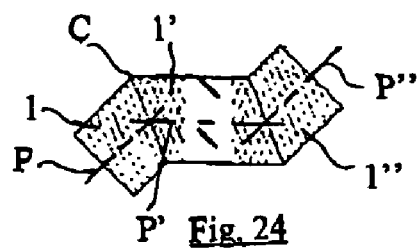

The intermediate piece of the duct formed by the primary portion (1') is then turned on itself through 180° as illustrated in FIG. 23, to form the inflection, and the three portions (1, 1', 1") are connected in such a way that their respective axes (P, P', P''') intersect in pairs at angles of 45°, as illustrated in FIG. 24. The most upstream axis P and the most downstream axis P''' are therefore parallel.

Quite particular attention will be paid to the precision with which the 22.5° angle is measured, otherwise there will be a loss in parallelism between the most upstream axis P and the most downstream axis P'''.

There is no need in this case to provide the deflectors.

The pieces are sealed as explained in the previous section.

Figure 25:
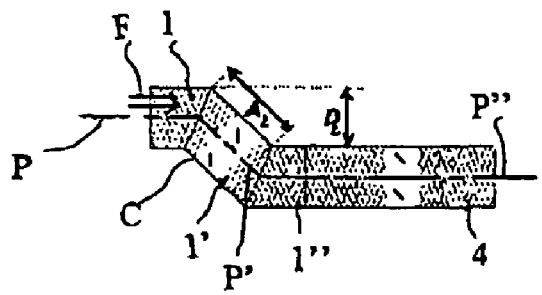
Figure 27:
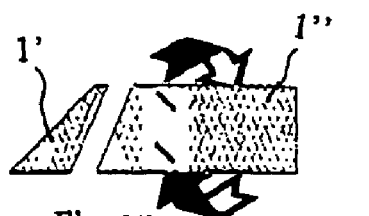
Figure 28:
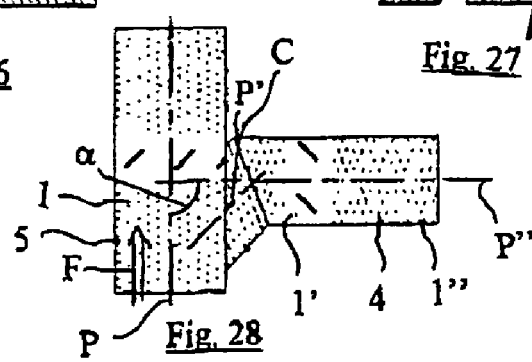
Figure 29:
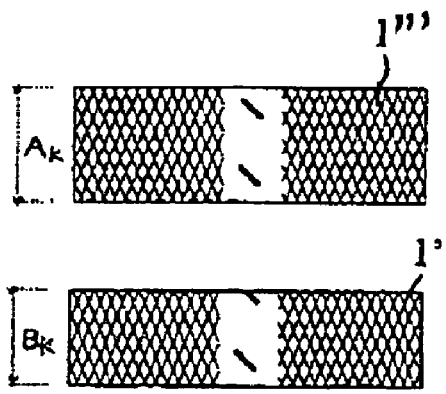
FIGS. 29 to 34 illustrate the production of a change in direction achieving a simple branch at a right angle $\alpha$ in a tubular duct according to the second alternative form of embodiment of the method according to the invention, with a reduction in the cross section of the main duct.

The table of FIG. 25 explains the separations $D_2$ between the main duct (1) and the secondary portion (1") as a function of the minimum length $A_2$ of the primary portion (1').

d. Single branches at a right angle α without a change in cross section of the main duct (FIGS. 26 to 28)

Figure 26:
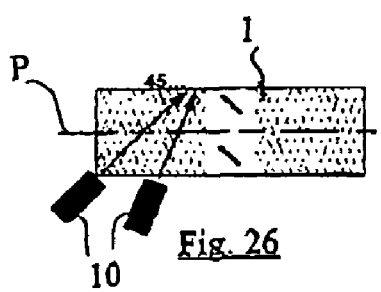
FIGS. 26 to 28 illustrate the production of a change in direction achieving a simple branch at a right angle $\alpha$ in a tubular duct according to the second alternative form of embodiment of the method according to the invention, without a change in the cross section of the main duct.

To produce a single branch at a right angle α without changing the cross section of the main duct, a 45° angle with respect to an imaginary perpendicular section is marked on the exterior surface (4) of the duct (1) as illustrated in FIG. 26, and a line is drawn. The same line is then drawn on the opposite face and these two lines are joined by transverse lines drawn on the two remaining faces.

The exterior surface (4) of the panel comprises a template made of marks (5) making it easier to draw the straight lines that will act as cutting lines.

A tangential circular saw or preferably the instrument (10) is used to cut the duct along the lines, paying particular attention to the inclination of the cut (perpendicular to the surface of the duct in the case of the lines at an angle of 45° and inclined by 45° in the case of the transverse lines). This then gives the first section of the piece that will form the branch.

At a distance of more than 5 cm away from the first sectioning operation, the same operation is performed again, but at an angle of 22.5° with respect to an imaginary perpendicular section. This then gives the three duct portions (1, 1', 1").

The final piece of the duct formed by the secondary portion (1") is then turned on itself through 180° as illustrated in FIG. 27 to form the branch, and the three portions (1, 1', 1") are connected in such a way that their respective axes (P, P', P") intersect in pairs at angles of 45°, as illustrated in FIG. 28. The angle α between the most upstream axis P and the most downstream axis P" is 90°.

Quite particular attention will be paid to the precision with which the 45° and 22.5° angles are measured otherwise branches of less than 90° (closed branches) or of more than 90° (open branches) will be obtained.

There is no need in this case to provide deflectors.

The parts are sealed as explained in the previous section.

e. Simple branches at a right angle α with a change in cross section of the main duct (FIGS. 29 to 34)

To produce a simple branch at a right angle α with a change in the cross section of the main duct, use is made of three straight portions. The first portion constitutes the main portion (1), illustrated in FIG. 30, the second portion constitutes the primary portion (1'), illustrated in FIG. 29, of width $B_K$, and will also be used to manufacture the secondary portion (1"), and the third portion constitutes the tertiary portion (1'''), also illustrated in FIG. 29, of width $A_K$.

Figure 30:
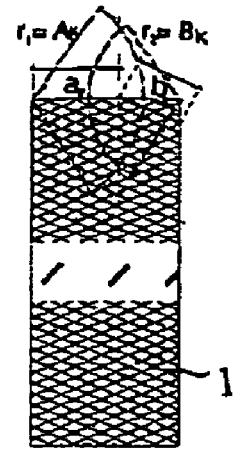

The first step is to draw an imaginary longitudinal line passing through the intersection of the curves of radius $r_1=A_K$ and $r_2=B_K$ on the exterior surface of the main portion (1) as illustrated in FIG. 30. The connection between the continuation of the main portion into the tertiary portion and the branch passes through this line.

Figure 33:
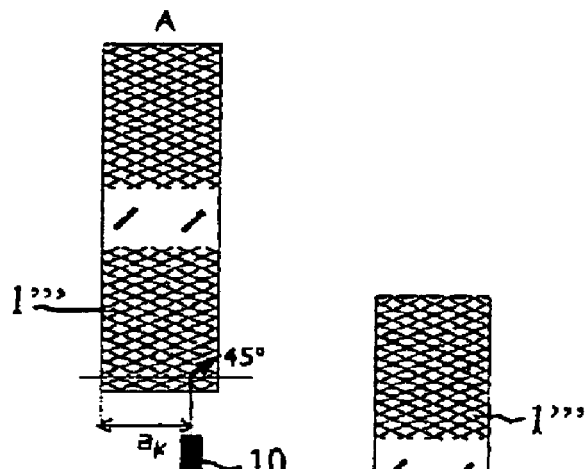
Figure 31:
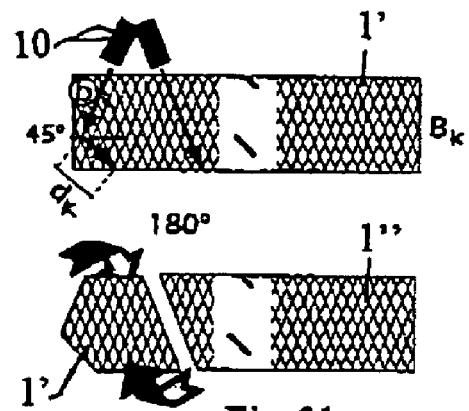

From this line, there is measured off, on one side, the reduced width $a_K$ of the tertiary portion (1''') at the intersection, that is transferred onto the tertiary portion (1''') as illustrated in FIG. 33, and on the exterior surface, on the other side, a straight line inclined by 22.5° with respect to an imaginary perpendicular section is drawn in order thus to obtain the measurement of the reduced width $b_K$ of the primary portion (1') that is transferred onto the primary portion (1') as illustrated in FIG. 31 as a straight line inclined by 22.5° with respect to an imaginary perpendicular section.

Once the measurement $a_K$ and $b_k$ have been transferred across, the interior points are joined by two straight lines inclined at 45° as far as the longitudinal ends of the portions.

On the primary portion (1'), at a distance of more than 15 cm away from the first sectioning operation, the second sectioning operation is performed at an angle of 22.5° with respect to an imaginary perpendicular section, to form the second portion (1"), the primary portion having then to be turned through 180° on itself, as for a right-angled elbow (cf. point b).

Figure 32:
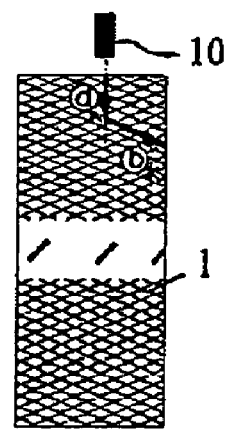

On the primary portion (1'), the measured value $b_K$ of this segment needs to be transferred onto the main duct (1) illustrated in FIG. 32, then the width $b_K$ needs to be transferred, on a straight line inclined at 22.5°, with respect to a transverse line of the main duct (1).

Figure 34:
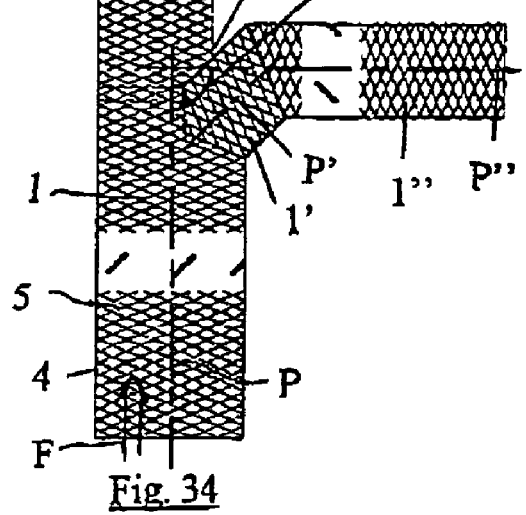

To form the branch, the four portions (1, 1', 1", 1''') are connected in such a way that the respective axes (P, P', P''') of the portions (1, 1', 1") intersect in pairs at an angle of 45° and that the axes of the main portion (1) and of the tertiary portion (1''') are parallel, as illustrated in FIG. 34. The angle α between the most upstream axis P and the most downstream axis P'" of the branch is 90°.

Quite particular attention will be paid to the precision with which the 45° and 22.5° angles are measured, otherwise a branch of less than 90° (closed branch) or of more than 90° (open branch) will be obtained.

The is no need in this case to provide deflectors.

The pieces are sealed as explained in the previous sections.

f. Double branches at two right angles α (FIGS. 35 to 41)

The elbows of the branches in this figure, commonly known as a "breeches" connection, are produced as described in section b above. Each branch (left, right) is thus formed of a primary portion (1') and of a secondary portion (1"), the left and right secondary portions (1") coming respectively from the left and right primary portions (1'). The two 90° elbows (left, right) may have different downstream cross sections, the sum of which is greater than the cross section of the main duct, their height having nonetheless to be identical to that of the main portion.

The first step consists in drawing a longitudinal line passing through the intersection of the curves of radius $r_1=A_L$ and $r_2=B_L$, as illustrated in FIG. 36, $A_L$ and $B_L$ representing the respective widths of the interior cross sections of the left and right branches, as illustrated in FIG. 35. The connection of the two branches passes through this line. From this line, there is drawn, on each side, two straight lines inclined by 22.5° in order thus to obtain the measurements $a_L$ and $b_L$ that are transferred onto the branches, as illustrated in FIG. 39.

Once the measurements $a_L$ and $b_L$ have been transferred across on two straight lines inclined by 22.5° on each branch, the interior points are joined using two straight lines inclined at 45° as far as the ends of the branches. The difference between the values of these segments needs to be transferred onto the main duct (1), illustrated in FIGS. 37 and 38, and constitutes the separation between the two primary portions (1') inclined at 22.5° and the main duct (1).

It will be easy to check that, if the sum of the interior cross sections of the branches is equal to the interior cross section of the main duct, this difference takes the value 0, and the edges of the pieces need merely to be cut at 45° in the region of connection of the branches. It is advisable for this cut to be made first, before the cuts corresponding to $a_L$ and $b_L$.

As before, it is of course necessary to surround the exterior part of the connections with self-adhesive tape and to bond the interior part of the connections of the duct.

The invention claimed is:

1. An insulating panel for a conditioned-air distribution duct, the insulating panel comprising:
   at least one insulating core based on mineral wool,
   wherein an exterior face of the insulating panel includes a plurality of marks that are straight and oblique with respect to a longitudinal direction of the insulating panel, the marks forming two sets of opposing inclinations oriented at an angle λ with respect to the longitudinal direction, wherein the exterior face includes a plurality of transverse straight marks oriented at right angles to the longitudinal direction and/or a plurality of longitudinal straight marks oriented parallel to the longitudinal direction, and wherein the transverse straight marks and/or the longitudinal straight marks intersect the oblique straight marks at points where the oblique straight marks of opposing inclination intersect.

2. The insulating panel as claimed in claim 1, wherein the mineral wool of the at least one insulating core is rock wool.

3. The insulating panel as claimed in claim 1, further comprising an exterior layer based on a thin skin of aluminum.

4. The insulating panel as claimed in claim 1, wherein the exterior face includes the plurality of transverse straight marks oriented at right angles to the longitudinal direction.

5. The insulating panel as claimed in claim 1, wherein the exterior face includes the plurality of longitudinal straight marks oriented parallel to the longitudinal direction.

6. The insulating panel as claimed in claim 1, wherein the exterior face includes the plurality of transverse straight marks oriented at right angles to the longitudinal direction and the plurality of longitudinal straight marks oriented parallel to the longitudinal direction.

7. A distribution duct having a substantially parallelepipedal cross section, the duct comprising:

at least one insulating panel including at least one insulating core based on mineral wool, wherein an exterior face of the insulating panel includes a plurality of marks that are straight and oblique with respect to a longitudinal direction of the insulating panel, the marks forming two sets of opposing inclinations oriented at an angle λ with respect to the longitudinal direction, and wherein the duct has a main longitudinal axis P and at least one change of direction C at an angle β, altering the main longitudinal axis P into a downstream axis P', the angle β being between 30° and 60°.

8. The distribution duct as claimed in claim 7, wherein the angle λ is between 82.5° and 52.5°.

9. The distribution duct as claimed in claim 7, wherein the exterior face also includes a plurality of transverse straight marks oriented at right angles to the longitudinal direction.

10. The distribution duct as claimed in claim 9, wherein the exterior face also includes a plurality of longitudinal straight marks oriented parallel to the longitudinal direction.

11. The distribution duct as claimed in claim 10, wherein the oblique straight marks, and/or the transverse straight marks, and/or the longitudinal straight marks are embodied at least near longitudinal edges of the exterior face.

12. The distribution duct as claimed in claim 10, further comprising an exterior layer based on a thin skin of aluminum, wherein the oblique straight marks, and/or the transverse straight marks, and/or the longitudinal straight marks are embodied on a surface of an exterior face of the exterior layer.

13. The distribution duct as claimed in claim 10, wherein the transverse straight marks and/or the longitudinal straight marks intersect the oblique straight marks at points where the oblique straight marks of opposing inclination intersect.

14. The distribution duct as claimed in claim 10, wherein the oblique straight marks, and/or the transverse straight marks, and/or the longitudinal straight marks are embodied across an entire surface of the exterior face.

15. The distribution duct as claimed in claim 7, wherein the mineral wool of the at least one insulating core is rock wool.

16. The distribution duct as claimed in claim 7, further comprising an exterior layer based on a thin skin of aluminum.

17. The distribution duct as claimed in claim 7, wherein the angle λ is equal to 67.5°.

18. The distribution duct as claimed in claim 7, wherein the angle β is equal to 45°.

* * * * *

UNITED STATES PATENT AND TRADEMARK OFFICE
CERTIFICATE OF CORRECTION

| | | |
|---|---|---|
| PATENT NO. | : 7,798,176 B2 | Page 1 of 1 |
| APPLICATION NO. | : 10/517616 | |
| DATED | : September 21, 2010 | |
| INVENTOR(S) | : Gabriel Navarro Niedercorn | |

It is certified that error appears in the above-identified patent and that said Letters Patent is hereby corrected as shown below:

In column 10, line 19 change:
"D," to --$D_1$--

In column 13, Claim 1, line 2 change:
"$\lambda$" to --$\gamma$--

In column 13, Claim 7, line 36 change:
"$\lambda$" to --$\gamma$--

In column 14, Claim 8, line 4 change:
"$\lambda$" to --$\gamma$--

In column 14, Claim 17, line 36 change:
"$\lambda$" to --$\gamma$--

Signed and Sealed this
Tenth Day of May, 2011

David J. Kappos
*Director of the United States Patent and Trademark Office*